United States Patent Office 3,476,759
Patented Nov. 4, 1969

3,476,759
2- AND 3-(4-PIPERIDYL) INDANES
AND INDANOLS
Vasken Paragamian, Dresher, Pa., assignor to
McNeil Laboratories, Incorporated, a corporation of Pennsylvania
No Drawing. Continuation-in-part of application Ser. No. 422,412, Dec. 30, 1964. This application May 2, 1967, Ser. No. 635,368
Int. Cl. C07d 29/10; C07c 15/22
U.S. Cl. 260—293                        18 Claims

ABSTRACT OF THE DISCLOSURE

The compounds are of the class of substituted indanes and indanols, useful for their pharmacological properties as hypotensive agents.

---

This application is a continuation-in-part of my copending application Ser. No. 422,412, filed Dec. 30, 1964, now abandoned.

This invention relates to a new series of compounds. More particularly, it concerns certain substituted indane and indanol compounds which may be represented by the formula.

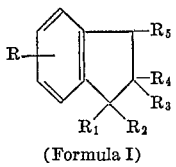

(Formula I)

In the above formula R stands for H, lower alkyl, lower alkoxy, halo or trihalomethyl; $R_1$ stands for hydrogen or hydroxy; $R_2$ sands for hydrogen, phenyl or substituted phenyl (wherein the substituent is lower alkyl, lower alkoxy, chloro or trihalomethyl); $R_3$ stands for hydrogen or aminocarbonyl; each of $R_4$ and $R_5$ is a member selected from the group consisting of hydrogen, piperidyl and loweralkylpiperidyl; wherein when one of $R_4$ and $R_5$ is hydrogen, the other is piperidyl or loweralkylpiperidyl and when one of $R_4$ and $R_5$ is piperidyl or loweralkylpiperidyl, the other is hydrogen; and wherein when $R_3$ is aminocarbonyl, $R_4$ is loweralkylpiperidyl and $R_5$ is hydrogen; and nontoxic therapeutically active acid addition salts thereof.

As used herein, loweralkyl may be straight or branch chained and have from 1 to 4 carbon atoms, such as, for example, methyl, ethyl, propyl, isopropyl, butyl, isobutyl, tertiary butyl and the like.

Compounds of the structure represented by Formula I wherein $R_1$ is hydroxyl and $R_2$ is hydrogen are prepared from the corresponding indanones (Formula II), wherein $R_3$, $R_4$, and $R_5$ are as previously described, by reduction with hydrogen in a

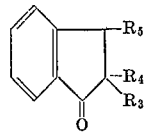

(Formula II)

solvent in the presence of a catalyst such as platinum, palladium or Raney nickel. Suitable solvents for the hydrogenation are the lower alkanols such as methanol, ethanol, isopropanol, etc., or acidic solvents such as propionic acid or acetic acid. These indanols may also be obtained by the use of metal boro- or aluminum hydrides such as sodium borohydride, potassium borohydride or lithium aluminum hydride in alcoholic (for the borohydrides) or inert organic solvents such as ether or tetrahydrofuran (for the aluminum hydrides).

Compounds of the structure represented by Formula I wherein $R_1$ is hydroxyl and $R_2$ is phenyl or substituted phenyl are prepared from the indanones (Formula II), wherein $R_3$ is hydrogen, $R_4$ and $R_5$ are hydrogen, piperidyl or loweralkylpiperidyl and when one of them is hydrogen the other is piperidyl or loweralkylpiperidyl, by reaction with phenyl lithium or an appropriately substituted phenyl lithium (wherein the substituent is a member selected from the group consisting of loweralkyl, loweralkoxy, chloro, trihalomethyl) in a refluxing inert organic solvent such as ether, tetrahydrofuran, benzene, ethylene glycol dimethyl ether, etc. Alternatively the corresponding phenyl magnesium halides may be employed in place of the lithium compounds.

Componds of the structure represented by Formula I where $R_1$ and $R_2$ are hydrogen, $R_3$ is hydrogen, $R_4$ and $R_5$ are hydrogen, piperidyl or loweralkylpiperidyl (wherein when one of them is hydrogen the other is piperidyl or loweralkylpiperidyl) are prepared from the corresponding indanols, described above, by dehydration of the latter with a strong acid such as sulfuric acid, concentrated hydrochloric acid or concentrated hydrobromic acid, etc., to produce the corresponding indenes. These in turn are hydrogenated catalytically to the corresponding indanes in an alcohol, such as methanol, ethanol or isopropanol, or in an acid, such as acetic acid, in the presence of catalysts such as platinum, palladium or Raney nickel. Alternatively, the indanols may be hydrogenolyzed directly to the indanes with hydrogen in acetic acid solution in the presence of catalysts such as platinum or palladium.

Compounds of the structure represented by Formula I where $R_1$ is hydrogen, $R_2$ is phenyl or substituted phenyl (the substituent being as described above) and $R_3$, $R_4$ and $R_5$ are as described above may be prepared by the two methods described for the preparation of compounds where $R_1$ and $R_2$ are hydrogen.

Compounds of the structure represented by Formula I wherein $R_1$ is hydroxyl, $R_2$ is hydrogen, $R_3$ and $R_4$ are hydrogen and $R_5$ is piperidyl or loweralkylpiperidyl may also be prepared from the corresponding pyridyl indanone (Formula II), where $R_3$ and $R_4$ are hydrogen and $R_5$ is pyridyl, by catalytic hydrogenation with hydrogen in an alcohol, such as methanol, ethanol or isopropanol, or an acid such as acetic acid or hydrochloric acid in ethanol in the presence of catalysts, such as platinum, palladium or Raney nickel.

The intermediate indanones (Formula II) are prepared by one of the three methods outlined below:

METHOD 1

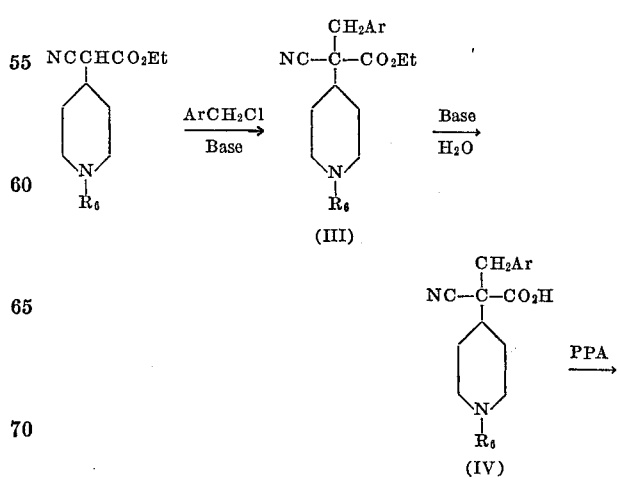

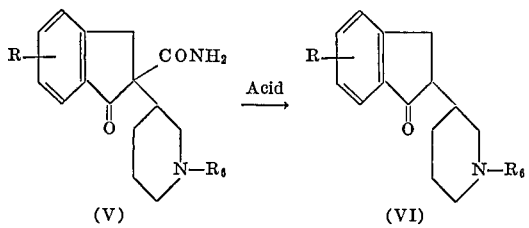

In the above formulas, $R_6$ is hydrogen or loweralkyl.

The 4-piperidyl cyanoacetate is alkylated with an appropriately substituted benzyl halide or sulfonic ester in an alcoholic solvent such as methanol, ethanol or t-butanol, using a metal alkoxide, such as sodium methoxide or ethoxide or potassium t-butoxide as the base, or in an inert solvent, such as the dimethyl ether of ethylene glycol, tetrahydrofuran, benzene, etc., with an alkali metal amide or hydride, such as sodamide or sodium hydride, as the base. The new cyanoacetate (Formula III) is hydrolyzed in aqueous alcoholic base, such as sodium or potassium hydroxide to the corresponding acid (Formula IV) which in turn is cyclized with a strong dehydrating agent, such polyphosphoric acid, to the indanone (Formula V). This in turn is hydrolyzed and decarboxylated in a strong aqueous acid, such as hydrochloric·hydrobromic or sulfuric acid, to the indanone (Formula VI).

METHOD 2

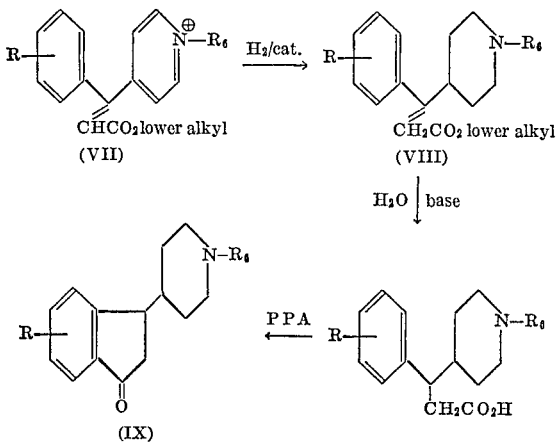

The quaternary salt (Formula VII) is hydrogenated with hydrogen and a catalyst, such as platinum, palladium or Raney nickel, in aqueous or alcoholic solution to give the piperidyl compound (Formula VIII), which is saponified under alkaline conditions to the corresponding acid and this in turn is cyclized with a strong dehydrating agent such as polyphosphoric acid or hydrofluoric acid to the indanone (Formula IX).

METHOD 3

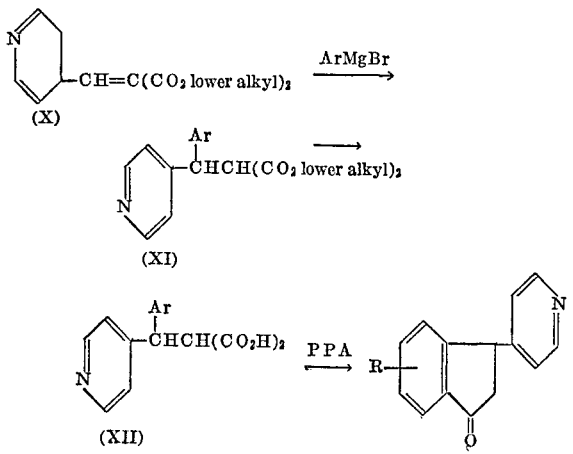

Addition of an appropriately substituted phenyl magnesium bromide to the pyridylmethyl malonate (Formula X) in the cold in an inert solvent, such as ether, tetrahydrofuran or benzene, leads to the substituted ester (Formula XI), which is then saponified and cyclized to the indanone (Formula XII) as described in Methods 1 and 2.

The therapeuticaly active non-toxic acid addition salts of these compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mendelic, cinnamic, methane sulfonic benzene sulfonic, salicylic, 2-phenoxybenzoic. Conversely, the salt form may be converted in the usual manner into the free base.

The compounds of this invention possess valubale pharmacological properties as hypotensive agents. A blood pressure lowering of 40 mm. of Hg or more is observed in anesthetized dogs after intravenous administration of doses of 1–16 mg./kg. of body weight. For example, in Formula I when R, $R_3$ and $R_5$ are hydrogen, $R_1$ is hydroxyl, $R_2$ is phenyl and $R_4$ is 1-methyl-4-piperidyl, a blood pressure lowering of 40 mm. of Hg is observed at a dose of 4 mg./kg. of body weight. The corresponding acid addition salts have the same utility as the basic compounds.

The following examples are intended to illustrate but not to limit, the scope of the invention.

EXAMPLE I

A 200 ml. ethanol solution of ethyl (1-methyl-4-piperidylidene) cyanoacetate (41 g., 0.19 mole) containing 1.0 g. of platinum oxide catalyst is hydrogenated at room temperature at an initial pressure of 51 p.s.i. The hydrogen uptake stops after 102 percent of the theoretical amount is absorbed (20 min.). The catalyst is filtered, the filtrate is concentrated and the residual liquid distilled to give the saturated cyanoacetate as a light yellow liquid, B.P., 123–125° C. at 0.7 mm. The hydrochloride salt is prepared by reaction with ethanol-hydrogen chloride and after one recrystallization from ethanol-ether gives ethyl cyano-(1-methyl-4-piperidyl) acetate hydrochloride, as a white solid, M.P., 163–164° C.

EXAMPLE II

To a 7.0 g. (0.145 mole) sodium hydride (52% suspended in mineral oil) suspension in dimethoxyethane is added ethyl cyano-(1-methyl-4-piperidyl) acetate (30 g., 0.143 mole) dissolved in 100 ml. of dimethoxyethane. After the evolution of hydrogen stops, benzyl chloride (20 g., 0.158 mole) is added and the resulting mixture is refluxed for 3 hours. It is then concentrated to one half its volume, diluted with water, made acidic with dilute hydrochloric acid and washed with ether. The aqueous layer is made basic with potassium carbonate and extracted with ether. Drying and removal of the solvent leaves the desired product as a light orange oil of ethyl 2-benzyl-2-cyano-1-methyl-4-piperidineacetate. The hydrochloride salt is prepared as in Example I and after one recrystallization from ethanol-ether has a M.P. 208–209° C.

EXAMPLE III

Ethyl 2-benzyl-2-cyano-1-methyl-4-piperidineacetate (72 g., 0.24 mole) is hydrolyzed by refluxing in aqueous methanol in the presence of 9.6 g. (0.24 mole) of sodium hydroxide for 2½ hours. After cooling the reaction mixture is acidified to pH 5 and the separated solid is filtered, washed with water and dried to give a white solid of 2-benzyl-2-cyano-1-methyl-4-piperidine acetic acid, M.P. 244° C.

EXAMPLE IV

To warm (60° C.) polyphosphoric acid (600 g.) is added 60 g. (0.22 mole) of 2-benzyl-2-cyano-1-methyl-4- piperidine acetic acid over a period of 45 min. The resulting mixture is stirred at 90–100° C. for 4 hours. It is then poured onto ice and the solution is made basic with solid potassium hydroxide and extracted with chloroform. Drying and removal of the solvent leaves a tan solid. Two recrystallizations from hexane-ethyl acetate give white prisms of 2-(1-methyl-4-piperidyl)-1-oxo-2-indane carboxamide, M.P., 165–165.5° C.

EXAMPLE V

2 - (1 - methyl - 4 - piperidyl) 1 - oxo - 2 - indanecarboxamide (31 g., 0.11 mole) is hydrolyzed (and decarboxylated) by refluxing for 3 hours in 180 ml. of 19 percent aqueous hydrochloric acid. After basification with sodium hydroxide the product is extracted with ether and concentrated. Recrystallization of the residual solid from hexane-ethyl acetate gives white prisms of 2-(1-methyl-4-piperidyl)-1-oxoindane, M.P., 99.5–101° C.

EXAMPLE VI

To an ether solution of phenyl lithium (prepared from 21 g. of bromobenzene and 1.8 g. of lithium) is added 17 g. (0.07 mole) of 2-(1-methyl-4-piperidyl)-1-oxoindane, dissolved in 50 ml. of ether. The resulting solution is refluxed for 18 hours, poured into ice-water and the separated solid is filtered and dried to give a light tan solid, M.P., 180–183° C. Two recrystallizations from aqueous methanol give long transparent prisms of 2-(1-methyl-4-piperidyl)-1-phenyl-1-idanol, M.P., 185–185.5° C.

EXAMPLE VII

To an ether solution of p-chlorophenyl lithium (prepared from 19 g. of p-chlorobromobenzene and 50 ml. of 14 percent butyl lithium) is added 15 g. of 2-(1-methyl-4-piperidyl)-1-oxoindane dissolved in benzene. The resulting mixture is stirred at room temperature for 3 hours then poured into ice-water and the precipitated solid is filtered. Three recrystallizations from ethanol give white crystals of 1-(p-chlorophenyl)-2-(1-methyl-4-piperidyl)-1-indanol, M.P., 221–222° C.

EXAMPLE VIII

To a 9 g. (0.023 mole) suspension of sodium borohydride in 50 ml. of isopropyl alcohol is added 6.5 g. (0.024 mole) of 2-(1-methyl-4-piperidyl)-1-oxo-2-indanecarboxamide dissolved in 25 ml. of isopropyl alcohol and the resulting mixture is stirred at room temperature for 16 hours, then refluxed for 2 hours, poured into dilute hydrochloric acid, washed with ether, made basic with potassium carbonate and extracted with chloroform. Drying and removal of the solvent leaves a white solid of 1-hydroxy - 2 - (1 - methyl - 4 - piperidyl) - 2 - indanecarboxamide, M.P., 198–212° C. Two recrystallizations from ethyl acetate-ethanol raised the melting point to 224–225° C.

EXAMPLE IX

To a 0.7 g. suspension of sodium borohydride in 40 ml. of isopropyl alcohol is added 2-(1-methyl-4-piperidyl)-1-oxo-indane (3.7 g., 0.016 mole) dissolved in the same alcohol and the resulting solution is stirred at room temperature for 16 hours, then heated at 60° C. for 2 hours, poured into dilute hydrochloric acid, washed with ether, made basic with potassium carbonate and extracted with chloroform. Drying and removal of the solvent leaves a white solid, M.P. 174–1760 C. A recrystallization from aqueous methanol gives soft white needles of 2-(1-methyl-4-piperidyl)-1-indanol, M.P. 179.5–180° C.

EXAMPLE X 2-(1-methyl-4-piperidyl)-1-phenyl-1-indanol (32 g., 0.1 mole) is dehydrated by warming to 60° C. with 300 ml. of 2 M sulfuric acid for 20 min. The solution is then poured into a cold potassium hydroxide solution and extracted with ether. Drying and removal of the solvent leaves a clear yellow oil. A fumarate salt is prepared and crystallized twice from methanol-ether to give a white solid of 2-(1-methyl-4-piperidyl)-3-phenylindene fumarate, M.P., 209–210° C.

EXAMPLE XI 2-(1-methyl-4-piperidyl)-1-indanol (11 g., 0.047 mole) is dehydrated by reaction with 100 ml. of 2 M sulfuric acid at 60° C. for 16 hours. The crude product (isolated as described in Example X) is converted to its fumarate salt and recrystallized from methanol to give a white solid of 2-(1-methyl-4-piperidyl) indene fumarate, M.P., 204–205° C.

EXAMPLE XII 2-(1-methyl-4-piperidyl)-3-phenylindene (8. g., 0.028 mole) is hydrogenated at room temperature in glacial acetic acid in the presence of platinum oxide catalyst (0.7 g.) at an initial pressure of 50 p.s.i. After the hydrogen uptake stops (3 hours) the catalyst is filtered, the filtrate is concentrated, diluted with water, made basic with potassium carbonate and extracted with ether. Drying and removal of the solvent gives an oil which is partially crystallized. Two recrystallizations from heptane give a white solid of 1-phenyl-2-(1-methyl-4-piperidyl)-indane, M.P., 125–126.5° C.

A hydrochloric salt is prepared and recrystallized from methanol-ether to give a white solid, 1-phenyl-2-(1-methyl-4-piperidyl)-indane hydrochloride, M.P., 247–248° C.

EXAMPLE XIII

A 9 g. (0.042 mole) sample of 2-(1-methyl-4-piperidyl) indene is hydrogenated in glacial acetic acid at 45 p.s.i. in the presence of 1 g. of platinum oxide catalyst at room temperature. After the hydrogen uptake stops, (30 min.) the reaction mixture is worked up as described in Example I. The crude product is converted to its fumarate salt which after two recrystallizations from methanol give a white solid of 2-(1-methyl-4-piperidyl) indane fumarate, M.P., 220–221° C.

EXAMPLE XIV 4-pyridinecarboxaldehyde (54 g., 0.5 mole), dimethyl malonatae (73 g., 0.55 mole) benzoic acid (3.3 g.) and piperidine (4 ml.) are mixed in 280 ml. of benzene and the resulting solution is refluxed azeotropically using a Dean-Stark trap for 3½ hours, at which time the theoretical amount of water (8 ml.) is collected. After cooling, the benzene solution is washed with water, dilute sodium bicarbonate solution and dried. Removal of the solvent leaves an oil which deposits a tan solid in petroluem ether-ether, M.P., 70–72° C. Two recrystallizations from aqueous methanol give white prisms of dimethyl (4-pyridylmethylene) malonate, M.P., 72–73° C.

EXAMPLE XV

To an ether solution of phenylmagnesium bromide [prepared from 64 g. of bromobenzene (0.4 mole) and 9.6 g. of magnesium (0.4 g. atom)] cooled to —5° C., is added an ether benzene solution of dimethyl (4-pyridylmethylene) malonate (40 g., 0.18 mole) over a period of 35 min. At the end of the addition the gummy precipitated mass is decomposed with dilute hydrochloric acid. The aqueous acidic solution is then washed with ether, made basic with potassium carbonate and extracted with chloroform. Drying and removal of the solvent leaves a tan solid, M.P., 84–88° C. Three recrystallizations from aqueous methanol give thin white prisms of dimethyl (phenyl-4-pyridyl) methyl malonate, M.P., 92.5–94° C.

EXAMPLE XVI

Dimethyl (phenyl-4-pyridyl) methylmalonate (87 g., 0.28 mole) is hydrolyzed by refluxing with 23 g. (0.56 mole) of sodium hydroxide in aqueous methanol for 4½ hours. After cooling the solution is acidified to pH 5–6 and the precipitated solid [presumably (phenyl-4-pyridyl) methylmalonic acid] is filtered and dried, M.P., 250° C. A 70 g. sample of this diacid is then treated with 800 g. of polyphosphoric acid at 90° C. for 5 hours. The reaction mixture is poured onto ice and made basic with potassium hydroxide. The separated solid is filtered and gives a light tan solid, M.P., 106–109° C. Two recrystallizations from hexane-ethyl acetate give white needles of 3-(4-pyridyl)-1-indanone, M.P., 111–112° C.

EXAMPLE XVII

A solution of 3.0 g. (0.014 mole) of 3-(4-pyridyl)-1-indanone in 100 ml. of ethanol is hydrogenated in the presence of 1.6 ml. of concentrated hydrochloric acid and 0.3 g. of platinum oxide catalyst at room temperature at an initial pressure of 48 p.s.i. for 2 hours. The catalyst is filtered off, the filtrate is concentrated, diluted with water, made basic with potassium carbonate and extracted with ether. The solvent is removed leaving a yellow oil which is converted to its fumarate salt by reaction with fumaric acid in methanol. Two recrystallizations of this solid salt from methanol-ether give white crystals of 3-(4-piperidyl)-1-indanol fumarate, M.P., 166.5–167.5° C.

EXAMPLE XVIII

Using the procedure of Example VI, and replacing the phenyl lithium with an equivalent quantity of one of the following:

p-methyl phenyl lithium
p-methoxy phenyl lithium
m-trifluoromethyl phenyl lithium the corresponding 2-(1-methyl-4-piperidyl)-1-substituted phenyl-1-indanols are prepared, more particularly the following:

2-(1-methyl-4-piperidyl)-1-(p-methylphenyl)-1-indanol
2-(1-methyl-4-piperidyl)-1-(p-methoxyphenyl)-1-indanol
2-(1-methyl-4-piperidyl)-1-(m-trifluoromethylphenyl)-1-indanol The substituted phenyl lithium reactants are prepared according to the procedure of Example VI, using in place of bromobenzene an equivalent amount of one of the following:

p-bromotoluene
p-methoxy bromobenzene
m-trifluoromethyl bromobenzene

EXAMPLE XIX

Using the procedure of Example V and replacing phenylmagnesium bromide with an equivalent amount of one of the following:

o-Tolylmagnesium bromide
p-Tolylmagnesium bromide
p-Chlorophenylmagnesium bromide
o-Methoxyphenylmagnesium bromide
m-Trifluoromethylphenylmagnesium bromide the corresponding dimethyl (1-substituted phenyl-4-pyridyl)methyl malonates are obtained, more particularly Dimethyl[1-(o-tolyl)-4-pyridyl]methyl malonate
Dimethyl[1-(p-tolyl)-4-pyridyl]methyl malonate
Dimethyl[1-(p-chlorophenyl)-4-pyridyl]methyl malonate
Dimethyl[1-(o-methoxyphenyl)-4-pyridyl]methyl malonate
Dimethyl[1-(m-trifluoromethylphenyl)-4-pyridyl]methyl malonate The substituted-phenylmagnesium bromide reactants are prepared according to the procedure of Example XV, using in place of bromobenzene anequivalent amount of one of the following:

o-Bromotoluene
p-Bromotoluene
p-Chloro bromobenzene
o-Methoxy bromobenzene
m-Trifluoromethyl bromobenzene

EXAMPLE XX

An 8 gram portion of ethyl β-phenyl-4-pyridine acrylate is reacted with an excess of methyl iodide in methanol solution. The reaction mixture is heated at reflux temperature for 2 hours. The reaction mixture is then concentrated. Upon dilution with ether, the product which separates is 4[(β - carbethoxy-α-phenyl)vinyl]-1-methylpyridinium iodide. Yellow crystals. After two recrystallizations from methanol-ether, the melting point is 181–182.5° C.

EXAMPLE XXI

A solution of 11 g. of 4-[(β-carbethoxy - α - phenyl)-vinyl]-1-methylpyridinium iodide in 150 ml. of ethanol is hydrogenated in the presence of 1 g. of platinum oxide catalyst according to the procedure used for the preparation of Example XX. The crude product is converted to its fumarate salt which is recrystallized from ethanol-ether to give white crystals of ethyl 1-methyl-β-phenyl-4-piperidine-propionate fumarate, M.P., 123–124.5° C.

EXAMPLE XXII

A 110 g. sample of ethyl 1-methyl-β-phenyl-4-piperidine-propionate is hydrolyzed by refluxing with 16 g. of sodium hydroxide in aqueous methanol for 4½ hours. After cooling it is acidified with hydrochloric acid and concentrated to dryness. The residue is added to 1000 g. of polyphosphoric acid and the resulting mixture is stirred and heated on a steam bath for 2½ hours. It is then poured into ice-water, made basic with potassium hydroxide and extracted with chloroform. Drying and removal of the solvent leaves a brown liquid which is distilled to give a light yellow liquid, B.P., 160° C./0.5 mm. The fumarate is prepared and recrystallized from ethanol-ether to give white crystals of 3-(1 - methyl-4-piperidyl)-1-oxoindane fumarate, M.P., 179–180° C.

EXAMPLE XXIII

A 5.2 g. sample of 3-(1-methyl-4-piperidyl)-1-oxoindane is reduced with 1.2 g. of sodium borohydride in isopropyl alcohol as described in Example IX. The crude product is converted to its fumarate salt which is recrystallized from ethanol, to give a white solid of 3-(1-methyl-4-piperidyl)-1-indanol fumarate, M.P., 210–211° C.

EXAMPLE XXIV

A 25 g. sample of 3-(1-methyl-4-piperidyl)-1-oxoindane is reacted with an ether solution of phenyl lithium (prepared from 34 g. of bromobenzene and 3.1 g. of lithium) as described in the preparation of Example VI. The crude product is recrystallized twice from aqueous methanol to give white crystals of 1-phenyl-3-(1-methyl-4-piperidyl)-1-indanol, M.P., 171–172° C.

EXAMPLE XXV

A 20 g. sample of 1-phenyl-3-(1-methyl-4-piperidyl)-1-indanol is dehydrated in 250 ml. of 2 M sulfuric acid according to the directions given in the preparation of Example X. A fumarate salt of the crude product is recrystallized from methanol-ether to give a white solid of 1-(1-methyl-4-piperidyl) - 3 - phenylindene, M.P., 174.5–175.5° C.

EXAMPLE XXVI

A 7.5 g. sample of 1-(1-methyl-4-piperidyl)-3-phenyl-indene is hydrogenated in glacial acetic acid in the presence of 0.6 g. of platinum oxide catalyst according to the directions given in the preparation of Example XII. The fumarate salt of the crude product is recrystallized twice from methanol-ether to give white crystals of 1-(1-methyl-4-piperidyl)-3-phenylindane fumarate, M.P., 168–169° C.

EXAMPLE XXVII

Using the procedure of Example XI, and replacing 2-(1-methyl - 4 - piperidyl)-1-indanol with an equivalent amount of 3-(1-methyl-4-piperidyl)-1-indanol, the resulting product is 1-(1-methyl-4-piperidyl) indene, M.P. of fumarate salt, 208–211° C.

EXAMPLE XXVIII

Using the procedure of Example XIII, and replacing 2-(1-methyl-4-piperidyl) indene with an equivalent amount of 1-(1-methyl-4-piperidyl) indene, the resulting product is 1-(1-methyl-4-piperidyl) indane.

EXAMPLE XXIX

Using the procedure of Example XVI and replacing dimethyl (phenyl-4-pyridyl)-methylmalonate with an equivalent amount of one of the substituted phenyl malonates of Example XIX, the following compounds are obtained:

3-(4-pyridyl)-4-methyl-1-indanone
3-(4-pyridyl)-6-methyl-1-indanone
3-(4-pyridyl)-6-chloro-1-indanone
3-(4-pyridyl)-4-methoxy-1-indanone
3-(4-pyridyl)-5-trifluoromethyl-1-indanone

EXAMPLE XXX

Using the procedure of Example XVII and replacing 3-(4-pyridyl)-1-indanone with an equivalent amount of one of the indanones of Example XXIX, the following compounds are obtained:

3-(4-piperidyl)-4-methyl-1-indanol
3-(4-piperidyl)-6-methyl-1-indanol
3-(4-piperidyl)-6-chloro-1-indanol
3-(4-piperidyl)-4-methoxy-1-indanol
3-(4-piperidyl)-5-trifluoromethyl-1-indanol

What is claimed is:

1. A member of the group consisting of susbtituted indanes and indanols having the formula

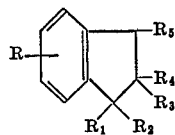

wherein R is a member selected from the group consisting of hydrogen, loweralkyl, loweralkloxy, halo and trifluoromethyl; $R_1$ is a member selected from the group consisting of hydrogen and hydroxy; $R_2$ is a member selected from the group consisting of hydrogen, phenyl, loweralkylphenyl, loweralkoxyphenyl, chlorophenyl and trifluoromethylphenyl; $R_3$ is a member selected from the group consisting of hydrogen and aminocarbonyl; each of $R_4$ and $R_5$ is a member selected from the group consisting of hydrogen, 4-piperidyl and 1-loweralkyl-4-piperidyl; wherein when one of $R_4$ and $R_5$ is hydrogen, the other is a member selected from the group consisting of 4-piperidyl and 1-loweralkyl-4-piperidyl and when one of $R_4$ and $R_5$ is a member selected from the group consisting of 4-piperidyl and 1-loweralkyl-4-piperidyl, the other is hydrogen; and wherein when $R_3$ is aminocarbonyl, $R_4$ is 1-loweralkyl-4-piperidyl and $R_5$ is hydrogen; and the nontoxic, therapeutically active acid addition salts thereof.

2. 2-(1-methyl-4-piperidyl)-1-phenyl-1-indanol.
3. 1-hydroxy-2-(1-methyl-4-piperidyl)-2-indane - carboxamide.
4. 2-(1-methyl-4-piperidyl)-1-indanol.
5. 1-phenyl-2-(1-methyl-4-piperidyl)-indane.
6. 2-(1-methyl-4-piperidyl)-indane.
7. 3-(4-piperidyl)-1-indanol.
8. 3-(1-methyl-4-piperidyl)-1-indanol.
9. 1-phenyl-3-(1-methyl-4-piperidyl)-1-indanol.
10. 1-(p-chlorophenyl)-2-(1-methyl-4-piperidyl)-1 - indanol.
11. 2-(1-methyl-4-piperidyl)-1-(p-methylphenyl - 1 - indanol.
12. 2-(1-methyl-4-piperidyl)-1-(p-methoxyphenyl) - 1-indanol.
13. 2-(1-methyl-4-piperidyl)-1 - (m - trifluoromethyl)-1-indanol.
14. 3-(4-piperidyl)-4-methyl-1-indanol.
15. 3-(4-piperidyl)-6-methyl-1-indanol.
16. 3-(4-piperidyl)-6-chloro-1-indanol.
17. 3-(4-piperidyl)-4-methoxy-1-indanol.
18. 3-(4-piperidyl)-5-trifluoromethyl-1-indanol.

References Cited

UNITED STATES PATENTS 3,328,411    6/1967    Borck et al. _____ 260—293

HENRY R. JILES, Primary Examiner
G. THOMAS TODD, Assistant Examiner

U.S. Cl. X.R.
260—293.4, 294, 294.7, 999

PO-1050
(5/69)

UNITED STATES PATENT OFFICE
CERTIFICATE OF CORRECTION

Patent No. 3,476,759            Dated    November 4, 1969

Inventor(s) Vasken Paragamian

It is certified that error appears in the above-identified patent and that said Letters Patent are hereby corrected as shown below:

Column 5, line 13, the numeral "19" should read --18--. Same column line 67, the numeral "1760C." should read --176°C--. Column 6, line 27, the numeral "125" should read --125.5--. Column 7, line 55, the example reference numeral "V" should read --XV--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents